United States Patent Office 3,537,286
Patented Nov. 3, 1970

3,537,286
REGULATING DEVICE FOR CONTROLLING AN APPLIANCE FOR THE TRANSPORT OF EXTRUDED MATERIAL ISSUING FROM EXTRUSION PRESSES
Harry Spielvogel and Gerhard Staubach, Dusseldorf, Germany, assignors to Schloemann Aktiengesellschaft, Dusseldorf, Germany, a German company
Filed Feb. 2, 1968, Ser. No. 702,691
Claims priority, application Germany, Feb. 15, 1967, Sch 40,244
Int. Cl. B21c 35/00
U.S. Cl. 72—24
5 Claims

ABSTRACT OF THE DISCLOSURE

Means, which may include both hydraulically and electrically actuated devices, for regulating the withdrawal of extruded material from the die of an extrusion press, in the direction of extrusion, under surplus power, comprising at least two regulating circuits operatively separated from one another, one for the speed and one for the pull of the withdrawing appliance, and with a throwover switch for setting the two regulating circuits in operation alternately.

---

Figure 1:
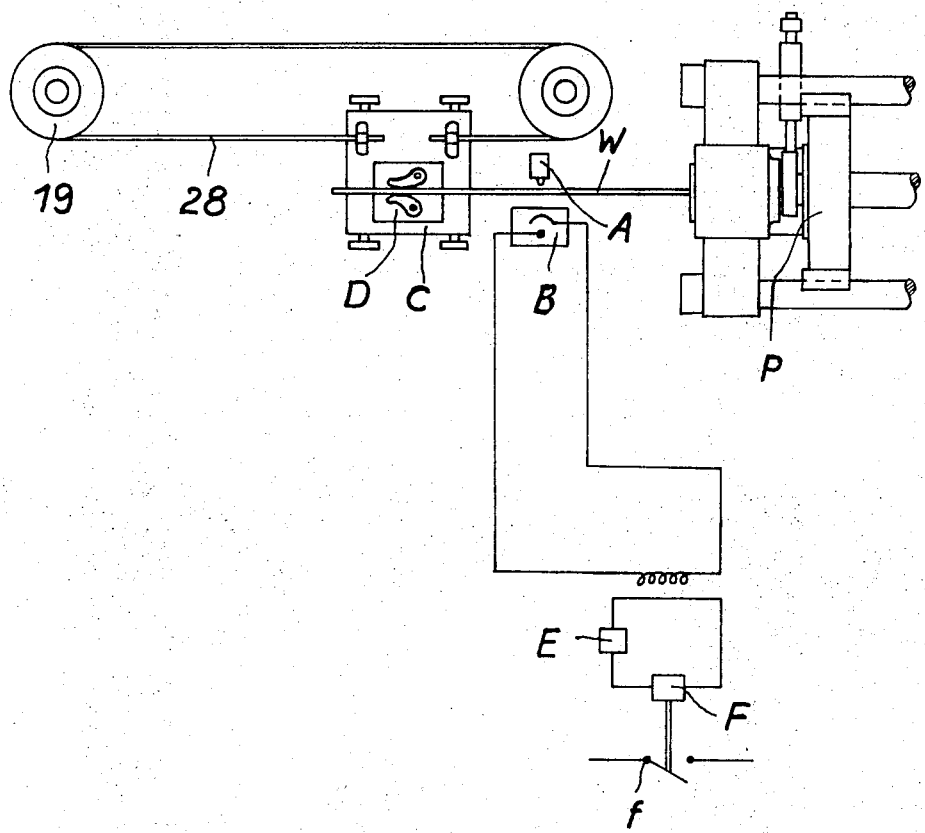

This invention relates to a regulating device for a withdrawing appliance which receives extruded material issuing from the die of an extrusion press, and withdraws it in the direction of extrusion with surplus power.

In known withdrawing appliances, after the reception of the extruded material in a carriage carrying the receiving appliance, this carriage is set in motion by means of a cable. In this case the receiving appliance is yieldingly supported in the carriage by means of springs, and provision is made for controlling the carriage by the relative motion of the receiving appliance for the carriage in the event of loading. The head end of the extrusion material runs with its output speed out of the extrusion press into the carriage located in front of it, which is then accelerated by its driving motor to the exit speed of the extruded material and beyond, for so long as the withdrawing appliance has not reached the speed of the issuing extruded product, this product yields transversely to the withdrawal appliance in the form of loops, and these loops have to be first raised, by an additional acceleration of the withdrawal appliance to the exit speed of the extruded product before the extruded product can be drawn with surplus power. Upon the drawing out of the loops the withdrawing appliance is suddenly braked by the limited length of the issuing extruded material. In this case, under some circumstances, the extruded product breaks, for in the plastic condition, upon the braking of the withdrawal appliance, the loading must take up from the mass moment of inertia thereof.

With this sudden retardation of the withdrawal appliance a follow-up control of the known appliance according to the exit speed of the extruded material sets in, that is to say, further sudden diminishing retardations occur, until the speed of the withdrawing appliance becomes equal to the exit speed of the extruded material. Upon the extruded material these sudden retardations are recorded as so-called chatter marks. On account of the relative movement between the carriage and the receiving appliance that is necessary for the controlling of the withdrawing appliance, it is furthermore requisite to store slidably either the receiving appliance or a roll of the tow line, this storage necessarily having to be readily accessible, notwithstanding rough operation of the press. In addition to this, for the switch-on element of the appliance, an electrical conductor runs along with the carriage that carries the receiving appliance over the entire length of movement of the carriage, and for the driving of a carriage a direct-current motor is a prerequisite.

The object of the invention is to provide a regulating device for a withdrawing appliance with which a reception of extruded material issuing from an extrusion press and a withdrawal in the direction of extrusion is rendered possible with surplus power, without rupturing the extruded material or giving rise to so-called chatter marks.

According to the invention this result is attained by the feature that for the controlling of the withdrawing appliance two regulating circuits are provided which are functionally separated from one another, namely one for the speed and one for the pull of the withdrawing appliance, and by providing, between the two regulating circuits, a reversing switch, for changing over from speed-regulation to surplus-power regulation. With this, before the nipping of the extruded material in the receiving appliance, the carriage carrying this receiving appliance is brought up to the speed of the issuing extruded material, and is maintained at this speed until nipping takes place, and the extruded material, after the throwing over of the switch to surplus-power regulation, is drawn out with surplus power. For regulating the speed of the withdrawing appliance a speed-measuring instrument measuring the speed of the withdrawing appliance here acts to indicate the actual speed, co-operating with a desired-value setting means specifying the exit speed of the extruded material as a speed for the withdrawing appliance, whilst for the regulating of the surplus power with which the extruded material is withdrawn, a dynamometer measuring the pull of the withdrawing appliance, as an indicator of actual value, co-operates with an indicator of desired value specifying the surplus power required, or in other words, the withdrawing force required.

In a further development of the invention, with the advantage of the constructional unit, in appliances with hydraulic regulating gear, a tachometer is coupled with the hydraulic motor of the regulating gear, between the driving motor and the pulling member, as an indicator of actual value for the regulation of speed, and, as an indicator of actual value for the regulating of surplus power, a pressure-meter is arranged in the hydraulic circuit. The measured actual values and the desired values are advantageously converted by rotary converters into electrical values, and with these values, in each case, in a bridge circuit between the converter for the actual value and the converter for the desired value, a control voltage is produced, which acts as an adjusting magnitude upon an electrically actuated regulating valve, which varies the power output of the hydraulic pump of the regulating gear.

As a tachometer followed by a rotary converter, a tacho-generator is provided, which is associated with a potentiometer and with the desired-value indicator, in a bridge circuit; and in a further bridge circuit, a pressure gauge followed by a potentiometer is associated with a further potentiometer and a desired-value indicator. Here the employment of potentiometers as desired-value indicators also permits, during the withdrawing operation, a readjustment of a preselected speed of the withdrawing appliance or of the desired surplus power with which the withdrawing appliance effects the withdrawal. The electrically actuated regulating valve is a plunger coil cooperating with a way valve.

Figure 2:
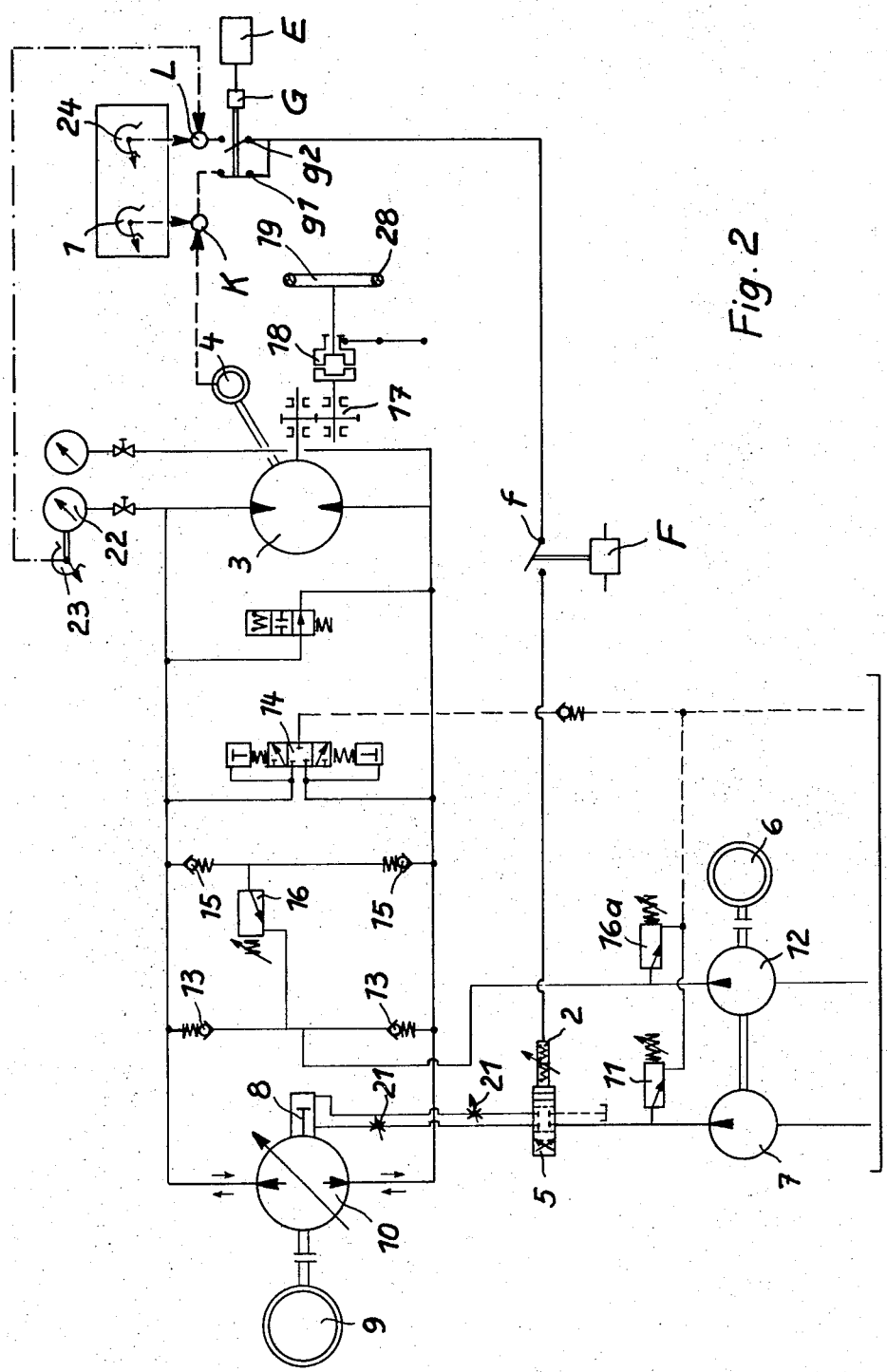

One embodiment of the invention is illustrated by way of example in the accompanying drawings, in which:

FIG. 1 is a simplified representation of an extrusion press and a withdrawing appliance for the extruded material; and FIG. 2 is a diagrammatic view of a regulating device for the withdrawing appliance of FIG. 1.

The extruded material W leaves the die aperture of an extrusion press P, and passes a light-barrier or cabinet, consisting of a source of light A and a photo-electric cell B, which, by way of a switch F and a contact f, closes a circuit between a potentiometer bridge circuit K and a plunger coil 2, and furthermore switches on a time relay E. The potentiometer bridge circuit K serves for generating a control voltage between a potentiometer 1, the so-called or normal-value indicator, and a tacho-generator 4 arranged on a hydraulic motor 3, the so-called actual-value indicator.

This control voltage sets in motion a carriage C of a withdrawal appliance co-operating with the extrusion press P, and in this carriage the control voltage acts by way of the plunger coil 2 upon a regulating valve 5. In this case, from a control pump 7, which is driven by a motor 6, pressure liquid, in this cases oil, is forced through the regulating valve 5 into a piston 8, which varies the delivery of a hydraulic pump 10 driven by a driving motor 9. In this way, so long as the quantity of oil delivered to hydraulic motor 3, which drives, by way of a driving wheel 19 and a cable 28, the carriage C carrying a receiving appliance D for the extrusion material W, is increasing, until the control voltage between the potentiometer 1 and the tacho-generator 4 is zero, that is to say, until the carriage C reaches the speed pre-selected to correspond to the extrusion speed, the die aperture and the container bore of the extrusion press and adjusted on the potentiometer 1. After this speed has been reached it is maintained constant, since a phase-dependent voltage difference in the potentiometer bridge circuit K between the potentiometer 1 and the tacho-generator 4 by way of the plunger coil 2, the regulating valve 5 and the piston 8 still leads again to a corresponding change in the delivery of the hydraulic pump 10, and therefore to a corresponding change in the speed of revolution of the hydraulic motor 3, until, by the time relay E, contact is given for the nipping of the extruded material W in the receiving appliance D. Here the regulating valve 5 goes into mid position, the position of the piston 8 and the delivery of the hydraulic pump 10 are fixed, and the oil delivered by the control pump 7 is discharged by way of a safety valve 11 so long as the control voltage is zero.

With the nipping of the extrusion material in the receiving appliance, the time relay E, by way of a further swich G and a contact $g^2$, interconnects a pressure-gauge 22, arranged on the hydraulic motor 3, with an after-connected potentiometer 23 as an actual-value indicator in a further potentionmeter bridge circuit L with a further potentiometer 24, and at the same time swiches off the tacho-generator 4 and the potentiometer 1, with the contact $g^1$. Thus the control voltage acting upon the plunger coil 2 is produced in the potentiometer bridge circuit between the potentiometer 24 and the potentiometer 23, that is to say, the speed of revolution of the hydraulic motor 3 is regulated according to its torque with which it drives the driving wheel 19 of the pulling member 28, the torque and therefore the pull of the withrawing appliance, being preselected with the potentiometer 24, which constitutes the desired-value or nominal-value indicator for the withdrawing force.

A filling pump 12 is mounted upon the same driving shaft as the control pump 7. This filling pump 12 delivers oil in the delivery direction of the hydraulic pump 10, that is, according to the direction of motion of the carriage C, by way of one of two non-return valves 13, into the pressure pipe from which the hydraulic pump 10 draws in oil by suction. If the filling pump delivers too much oil, this excess oil is discharged by way of a scavenging valve 14, the filling pump 12 being protected by a safety valve 16a. A safety valve 16 arranged in the hydraulic circuit likewise protects the hydraulic motor 3, which, by way of a counter-shaft gearing 17 and a coupling 18, drives the driving wheel 19, which, by means of the cable 28, pulls the carriage C that carries the receiving appliance.

Moreover in the inlet pipes to the piston 8, and in the outlet from the regulating valve 5 to the piston 8, a throttle valve 21 is in each case provided, which prevents the pump-adjusting means chattering, and gives the regulating device the desired stability.

We claim:
1. A device for regulating the withdrawal of extruded material from the die of an extrusion press in the direction of extrusion under surplus power, comprising: at least two regulating circuits operatively separated from one another, one for regulating the speed of withdrawal and the other for regulating the pull of the withdrawing appliance, and a throw-over switch for switching the two regulating circuits into operation alternately.

2. A device for regulating the withdrawal of extruded material from the die of an extrusion press as claimed in claim 1, further comprising: a pulling member for exerting the withdrawing force, a driving motor for actuating the pulling member, hydraulic regulating gear, including a hydraulic pump, interposed between the pulling member and the driving motor, a tachometer coupled to the hydraulic motor as an actual-value indicator, and a pressure-measuring instrument interposed in the hydraulic circuit of the hydraulic regulating gear as an actual-value indicator for regulating the surplus power.

3. A device for regulating the withdrawal of extruded material from the die of an extrusion press as claimed in claim 2, further comprising: converters for converting the actual and desired values into electrical values, bridge circuits between the converters for the actual values and the converters for the desired values, and a regulating valve for varying the delivery of the hydraulic pump, the said regulating valve being actuated by voltages generated in the said bridge circuits.

4. A device for regulating the withdrawal of extruded material from the die of an extrusion press as claimed in claim 1, further comprising: a pulling member for exerting the withdrawing force, a driving motor for actuating the pulling member, a hydraulic regulating gear provided between the said driving motor and the said pulling member, this hydraulic regulating gear consisting essentially of a hydraulic pump coupled to the said driving motor, and a hydraulic motor connected with the hydraulic pump and driving the pulling member, and the regulating device further comprising: a tachometer coupled to the hydraulic motor of an actual-value indicator for regulating the speed of the withdrawal appliance, a pressure-measuring instrument interposed in the hydraulic circuit of the said hydraulic regulating gear as an actual-value indicator for regulating the surplus power, an indicator for indicating the nominal value of the speed of withdrawal, and a separate indicator for indicating the nominal value of the withdrawing force.

5. A device for regulating the withdrawal of extruded material from the die of an extrusion press as claimed in claim 4, further comprising: means for converting the actual and nominal values of the speed and of the withdrawing force into electrical values, electrical bridge circuits between the converting means for the actual values and the converting means for the desired values, and a regulating valve which is actuated by the electrical voltages generated in the bridge circuits, and which varies the quantity of liquid delivered by the hydraulic pump of the hydraulic regulating gear.

References Cited

UNITED STATES PATENTS 3,150,213    9/1964    Doering.
3,312,091    4/1967    Kobayashi _____ 72—11

RICHARD J. HERBST, Primary Examiner

U.S. Cl. X.R.

72—257